United States Patent Office 2,752,285
Patented June 26, 1956

2,752,285
PROCESS FOR THE PRODUCTION OF AT LEAST APPROXIMATELY NEUTRAL SOLUTIONS OF SUBSTITUTED XANTHINES

Helmut Weissenburger, Konstanz, and Ladislaus Szabo, Munich, Germany

No Drawing. Application October 6, 1951, Serial No. 250,186

Claims priority, application Germany October 9, 1950

15 Claims. (Cl. 167—67)

The preparation of neutral or almost neutral solutions of substituted xanthines is already known. These compounds are heated with the salts of a phenol-carboxylic acid, and the respective xanthines are dissolved in aqueous solutions of these salts or the xanthines are brought into solution with the help of bases and the alkaline solution is then neutralised by the addition of the phenol-carboxylic acid. The sodium-, calcium-, and also amine salts of salicyclic acid and of m-hydroxy-benzoic acid have been suggested as being particularly suitable for this purpose.

In general it is not possible to prepare highly concentrated aqueous solutions of xanthines in this way. Often it is not possible to incorporate salts of alkaloids and the like in such solutions. Moreover the salicylic acid or salts of salicyclic acid when applied therapeutically show undesirable secondary reactions when prepared in this way, particularly on the patient's heart.

It has now been discovered that solutions of the xanthines which are much better tolerated are obtained if approximately neutral salts of sulfonic acid derivatives of hydroxy-aryl-carboxylic acids or salts with a slight alkaline or acid reaction, e. g. 4-sulfonic salicylic acid, 4-sulfonic-3-hydroxy-benzoic acid, 4-hydroxy-3-sulfonic benzoic acid and sulfonic derivatives of hydroxy-naphthoic acids and of 5-sulphosalicylic acid are used in place of the salts of salicyclic acid. As a rule it may be stated that the sulfonic acid derivatives of the hydroxy-naphthoic acids are the most suitable promoters for promoting the solubility. Compared with salicylic acid, the mentioned salts especially the salts of 5-sulphosalicylic acid show less toxicity. Besides it is possible to prepare relatively highly concentrated solutions which for instance are good for the preparation of such products as are applied in the form of drops, i. e. solutions which contain in 1 cc. (about 20 drops) and even less, sufficient of the xanthine for a therapeutic dose. Further, solutions can be prepared which in addition to xanthines, can contain other therapeutically valuable substances, e. g. heterocyclic bases particularly alkaloids, e. g. salts of these bases with the mentioned sulfonic acid derivatives of hydroxy-aryl-carboxylic acids.

The property of the aforesaid salts in increasing the solubility of the xanthines is probably based on similar secondary valencies as in the case of salicyclic salts.

It may happen sometimes that a part of the xanthines is precipitated especially when using only small amounts of substances promoting the solubility. This may be avoided by filling the filtered solution into ampoules; in addition thereto the filtered solution may be sterilised to avoid precipitation.

Apart from theophylline, caffeine, theobromine, furthermore 1-mono-methyl xanthine, 1.3-diethyl xanthine, 1.3-dihydroxy-ethyl xanthine may be mentioned by way of example as xanthines which are brought into solution according to the present invention. As chlorinated, substituted xanthines by way of example may be mentioned: chloro-caffeine, chloro-theophylline, chloro-theobromine.

According to the invention, such solutions can be prepared by adding the xanthine, particularly theophylline, together with one of the mentioned salts to water with heating or the xanthine may be dissolved in an aqueous solution of a base and one of the mentioned salts or the corresponding acid thereof (if sufficient of the base is present) may be added. A further method of preparing the solutions consists in dissolving the xanthine in one of the free acids referred to and in approximately neutralising the solution with a base. Heat may be applied in every case. Finally it is possible to produce the salt in the solution by adding the xanthine, the acid, and the base in the corresponding amounts to water. Thereby the xanthine is dissolved by the component added at first; preferably heat is applied.

The pH of the solutions thus prepared should be between about 5 and 7.5. If the solution contains sugar (see below) its pH should be below 7. If the solution also contains a glucoside (see below) its pH should be about 6 to 7. If salts of bases which are soluble with difficulty are used then the pH should preferably be about 5 to 6.8. If a glucoside viz. a sugar and a salt of a base which is soluble with difficulty are present in solution simultaneously then the pH should preferably be 6 to 6.8.

As bases and/or salts of these bases there come into consideration: inorganic bases, such as caustic soda, caustic potash, calcium hydroxide, ammonia, etc.; aliphatic bases, such as ethylene diamine, hydroxyethylamine, etc.; aromatic bases, such as benzylamine, phenylethylamine, N - methyl - 1 - phenyl - 2 - amino - propane, adrenaline, etc.; also heterocyclic compounds respectively alkaloids like papaverine, quinidine, narcotine, substituted tetrahydroisoquinoline, lobeline, ephedrine, $\gamma,\gamma$-diphenyl propylamines substituted on the nitrogen and the like, singly or together.

Other additions can be made to the prepared solutions, such as grape-sugar, glucosides, for example strophantin, rutin, scilla glucoside, digitalis glucosides, etc. As is well known, grape-sugar as well as most of the glucosides are extraordinary sensitive above all to alkali whereas they possess good stability and compatability with the neutral theophylline solutions prepared according to the invention. In addition thereto, the glucosides in general are more easily soluble in the prepared solutions than in distilled water.

Together with the proposed salts, additions of other products can be made with the object of increasing the solubility of the xanthines, as for example derivatives of pyridinecarboxylic acids, particularly salts of nicotinic acid and amides of nicotinic acid, whereby the concentration of each single product for increasing solubility can be less than would be the case if the particular substance was used by itself for obtaining complete solution of the xanthines.

Neutral or weakly acid xanthine solutions which have been prepared in the above manner are for therapeutic use often used together with carbohydrates, for example grape-sugar, fructose, invert sugar, etc. Glucosides, especially strophantine can also be added to such mixtures.

As is described above, it is naturally possible to dissolve afterwards carbohydrates as for example grape-sugar e. g. in the xanthine-5-sulphosalicylate solutions.

As is well known, grape-sugar, fructose, etc., are prepared by acid hydrolysis from polysaccharides (including disaccharides) as for example starches, inulin, etc. The preparation of invert sugar from cane sugar likewise requires acid. After the termination of the hydrolysis or inversion, the acid which has been employed must be removed. Generally dilute sulphuric acid is used as hydrolysing agent and after the completion of the reaction, it is eliminated by precipitation with calcium carbonate or barium carbonate and the calcium or barium sulfate is filtered off. The carbohydrates are isolated from the filtrates concentrated by evaporation.

On the other hand it has been found that the solutions of xanthine containing carbohydrates can be prepared in a considerably simpler way without it being necessary to remove the used acid and isolate the carbohydrates.

The primary carbohydrate, e. g. starch, inulin or cane sugar is inverted by the use of an aqueous solution of one of the mentioned acids according to the invention, e. g. 5-sulphosalicylic acid until the desired angle of rotation has been reached. The resulting acid solution is neutralised with any base (preferably weak ones or salts of bases with carbonic acid, e. g. sodium bicarbonate) and the substituted xanthine, e. g. theophylline is dissolved in the neutral or nearly neutral solution if necessary by the addition of further salts according to the invention and heating. It will be seen that by the mentioned neutralisation a salt according to the invention is produced in the solution thus enabling the dissolving of the xanthine, which may be added before, during, or after the inversion.

It is not absolutely necessary to continue the treatment of polysaccharides with acid solution until there is nothing left in the solution but monosaccharides rather can it be stopped before if from the therapeutic standpoint a certain content of di- or trisaccharides is desired.

It is advantageous for the treatment proper to take place at higher temperatures say 40, preferably 100–120° C.; it is however also possible, as in the case of the inversion of cane sugar, to employ lower temperatures, e. g. 40–50° C. For neutralisation there can be employed any bases as described hereinbefore, for example alkaloids, amines and inorganic bases, but preferably not those of alkali- and alkaline earth metals.

It is however advantageous to employ the carbonates of the corresponding bases in order to avoid damage to the resulting sugars particularly when the bases are relatively strong. Sodium and calcium bicarbonates have proved particularly suitable. Generally speaking carbonates of the bases in question may be used containing at least one carbonic acid residue. It is not absolutely necessary to neutralise the solution exactly. Frequently a weak acidity, e. g. pH value of 6.3–6.8 is suitable. After neutralisation the sugar solutions are appropriately treated with adsorption agents especially iron-free activated charcoal in order to remove if necessary pyrogene material which has been formed.

The xanthines can be dissolved in the solution so produced by heating, preferably at 60–100° C. Finally a glucoside, such as strophantine can be added.

To sum up: The invention consists in a process comprising the following steps: dissolving the substituted xanthine in water by suitable means, e. g. by heating e. g. to 60° C., preferably 80–100° C., or by adding a preferably strong alkali, or by both means, or by adding one of the mentioned acids. The alkali is preferably added in an amount of 1.5 mols or more to one mol xanthine, half of this amount being necessary in case of a bivalent base. To work at higher temperatures than 100° C. requires the use of pressure and does not offer any advantage. Then a sulphonic acid derivative of a hydroxyarylcarboxylic acid is added if alkali has been used to dissolve the xanthine, preferably at least an equal amount by weight of the xanthine, especially in an amount of 4–5 mols or more to one mol xanthine in order to obtain a 10% solution; even 15% solutions may be obtained by higher additions. If the xanthine has been dissolved by means of heat, instead of an acid, a salt according to the invention is added, viz. a mixture of salts. If the xanthine has been dissolved in an acid according to the invention a base must be added in order to produce a salt according to the invention. A mixture of bases may also be used. Generally speaking a substituted xanthine is brought in contact in water with a salt according to the invention, care being taken, that the xanthine is primarily dissolved by suitable means. It is then kept in solution by the mentioned salt. It is of advantage to use mixtures of the addition products. Water may also partially be replaced e. g. by glycerine or the ethylester of lactic acid. But this does not offer any advantage. The addition of the mentioned salts according to the invention may be carried out before, during, or after the solution of the xanthine has been prepared. Finally it is also possible to produce the salt to be added in the solution by adding the corresponding acid on the one hand and the corresponding base on the other hand. It is also possible to use chlorinated substituted xanthines. It is finally possible to dissolve polysaccharides in the water and to hydrolyse them by the addition of one or more of the formerly described sulphoacids according to the invention, neutralising the solutions to a pH as mentioned above and to dissolve the xanthine in such a solution preferably with heating either before, during, or after the neutralisation, or to do without heating, dissolving the xanthine by neutralising by a sufficient total amount of a base, i. e. sufficient to dissolve the xanthine and to neutralise the added acid.

The acid used for hydrolyzing may be neutralised before, during, or after the addition of the xanthine; in the first mentioned case the xanthine must be dissolved by heating, in the second and third case the xanthine is dissolved at least partly in the acid.

*Example 1*

20 gm. theophyllin and 70 gm. neutral sodium sulphosalicylate are dissolved by heating in 150 cc. distilled water and the resulting solution made up to a volume of 250 cc. with distilled water.

*Example 2*

15 gm. theophyllin and 55 gm. sulphosalicylate of ethylenediamine are dissolved by heating in 45 cc. distilled water and the resulting solution made up to 100 cc.

*Example 3*

10 gm. theophyllin, 5 gm. papaverine and 22 gm. diethanolamine are heated in about 100 cc. water. To this is added a concentrated aqueous solution of sulphosalicylic acid until a clear aqueous solution with a pH value of about 4.6–4.9 is obtained. 30 mgm. of atropine sulphate are then dissolved in the solution and after cooling, distilled water is added up to 250 cc.

*Example 4*

20 gm. theophyllin and 100 gm. calcium sulphosalicylate are dissolved by heating in 500 cc. distilled water and the resulting solution made up to 100 cc.

*Example 5*

10 gm. theophyllin, 5 gm. nicotinic acidamide and 30 gm. sodium sulphosalicylate are dissolved by heating in about 200 cc. distilled water and after cooling, the solution is made up to 250 cc.

*Example 6*

10 gm. theophyllin, 100 gm. grape-sugar and 35 gm. sodium sulphosalicylate are dissolved by heating in 400 cc. water; 25 mgm. k-strophantin are added to the resulting solution whilst still warm and the whole made up to 1000 cc.

*Example 7*

20 gm. theophyllin, 4 gm. ephedrine base, 25 sulphosalicylic salt of ethylene diamine and 50 gm. sodium sulphosalicylate are heated with about 100 cc. distilled water and the solution treated with a concentrated solution of sulphosalicylic acid until a pH-value of 6.5 is reached. It is then made up to 200 cc. with distilled water.

Example 8

10 gm. theophyllin, 0.3 gm. lobeline, 10 gm. sulphosalicylic salt of ethylene diamine and 35 gm. sodium sulphosalicylate are heated with about 50 cc. distilled water. The resulting solution is treated with a concentrated solution of sulphosalicyclic acid until a pH-value of 6.6 is reached and then made up to 100 cc.

Example 9

20 gm. caffeine and 40 gm. sodium sulphosalicylate are dissolved in 50 cc. distilled water and the solution after cooling is made up to 100 cc.

Example 10

10 gm. theophylline, 100 mgm. adrenaline hydrochloride, 10 gm. sulphosalicylic salt of ethylene diamine and 30 gm. calcium sulphosalicylate are dissolved by heating in about 150 cc. water. The solution which has a pH-value of 6.9 is brought to a pH-value of 6.4 by the addition of 0.1 gm. sulphosalicylic acid and the solution made up to 200 cc.

Example 11

10 gm. theophylline, 5 gm. N-α-pyridyl-N-benzyl-N',N'-dimethyl-ethylenediamine hydrochloride and 35 gm. sodium sulphosalicylate are dissolved by heating in 250 cc. water and the solution diluted to 500 cc.

Example 12

40 gm. sulphosalicylic acid are dissolved in 150 cc. water and 10 gm. p-aminobenzoic-diethylaminoester added to the solution; α-diethylaminoethanol is added until a neutral reaction is given, some 35 gm. are necessary. 15 gm. theophylline are dissolved in the solution by heating and the whole made up to 200 cc. and filtered.

Example 13

2 gm. dimethylaminoethyl-benzhydryl-ether is dissolved in an aqueous solution of sulphosalicylic acid and to this solution 18 gm. sulphosalicylic diethanolamine added. 1 gm. chlorotheophylline is dissolved therein by heating and after cooling 5 mgm. atropinemethylnitrate added. The solution is then filtered.

Example 14

21.5 gm. pure sulphosalicylic acid is dissolved in 200 cc. distilled water at 95° C. and to this is slowly added a suspension of 50 gm. pure wheat starch in 150 cc. water under stirring. This operation is carried out so slowly that the solution becomes viscous for only a short time at the most, and takes about 15 minutes. After the addition, the solution is heated for 8 hours to 100° C.; it is then made up to 450 cc. with water and heated (indirect heating) for a further 4 hours to 100° C. After cooling it is brought to a pH-value of about 6.65 by the addition of sodium bicarbonate; about 14.1 gm. are required. The solution is then treated with activated charcoal free from iron and filtered. 10 gm. theophylline and 12.5 gm. k-strophantin are dissolved in the filtrate with gentle heating. After making up to a volume of 500 cc. fibrous matter or the like is removed by filtering through sintered glass and the liquid filled into ampoules of 10 cc. which are sterilised as usual. The prepared solution has an optical rotation of $(\alpha)_D^{20} = +8.2$ deg. and may be taken without any fever reaction especially when administered by intravenous injection.

Example 15

100 gm. cane sugar and 30 gm. sulphosalicylic acid are dissolved in 500 cc. water and the solution is heated for 2 hours on a water-bath, at a temperature of about 50–55° C. After cooling, the solution is brought to a pH-value of 6.75 by the addition of about 19.8 gm. sodium bicarbonate; it is then treated with washed activated charcoal and filtered. 15 gm. calcium sulphosalicylate dissolved in 200 cc. water is added to the filtrate and 20 gm. theophylline is dissolved in the mixture by heating. The resulting solution is made up to 1000 cc. and after again filtering it is filled into 10 cc. ampoules. The optical rotation of the finished solution is $(\alpha)_D^{20} = -2.05$ deg. After sterilisation it may be taken without reaction.

Example 16

8 gm. of the sodium salt of 3-sulpho-4-hydroxy-benzoic acid and 1 gm. of theophylline are dissolved in 90 cc. of distilled water with warming and the solution thus formed is made up to 100 cc.

Example 17

2.5 gm. of theophylline and 16 gm. of the hydroxyethylamine salt of 3-sulpho-4-hydroxy-benzoic acid are dissolved in approximately 80 cc. of distilled water and the solution is made up to 100 cc. The solution is filtered and filled into 2 cc. ampoules.

Example 18

2.5 gm. of theophylline and 18 gm. of the β-diethylaminoethanol salt of 3-sulpho-4-hydroxy-benzoic acid are dissolved in approximately 80 cc. distilled water and the solution diluted to 100 cc. with distilled water and filled into ampoules.

Example 19

A solution according to the previous example is prepared from 2 gm. of theophylline and 12.5 gm. of the sodium salt of 4-sulpho-3-hydroxy-benzoic acid and filled into ampoules.

Example 20

A solution according to Example 18 is prepared from 4 gm. of caffein and 8 gm. of the sodium salt of 4-sulpho-3-hydroxy-benzoic acid and made up to 100 cc.

Example 21

1 gm. of theophylline and 7 gm. of the sodium salt of 5-sulpho-2-hydroxy-3-methyl-benzoic acid are dissolved in approximately 90 cc. of distilled water with warming and the solution made up to 100 cc.

Example 22

1 gm. of theophylline and 6 gm. of the sodium salt of 4-sulpho-salicylic acid are dissolved according to Example 21 and the solution which has been made up to 100 cc. is filled into ampoules.

Example 23

2 gm. of theophylline and 10 gm. of the sodium salt of sulpho-β-resorcylic acid are dissolved in approximately 80 cc. of distilled water, the solution thus formed is made up to 100 cc. and filled into ampoules after filtration.

Example 24

10 gm. of theophylline and 30 gm. of the sodium salt of 7-sulpho-3-hydroxy-naphthoic-(2)-acid are dissolved with warming in approximately 70 cc. of distilled water and the solution thus formed is made up to 100 cc.

Example 25

4 gm. of papaverine and 3.6 gm. of the monosodium salt of the 7-sulpho-3-hydroxy-naphthoic-acid-(2) are warmed with approximately 50 cc. of distilled water and 16 gm. of the sodium salt of 7-sulpho-3-hydroxy-naphthoic-2-acid and 10 gm. of theophylline are added after solution has taken place. The solution thus formed by heating is made up to 100 cc. and by the addition of approximately 0.1 gm. of sulpho-hydroxy-naphthoic acid is adjusted to a pH-value of 6.5. The solution is filled into 1 cc. ampoules.

Example 26

1 gm. of 8-chlorotheophylline, 18 gm. of a 10% solution of the salt of 1 mol of N-dimethylaminoethyl-N-p-methoxy-benzyl-α-amino-pyridine with 1 mol of 7-sulpho-3-hydroxy-naphthoic-acid-(2), 1.25 gm. of papaverine-5-sulpho-salicylate and 9 gm. of the sodium salt of 7-sulpho-3-hydroxy-naphthoic-(2)-acid are dissolved with warming in approximately 80 gm. of distilled water and the solution thus formed is made up to 100 cc. The solution is filled into ampoules.

Example 27

20 gm. of pure cane sugar are warmed in a solution of 1.5 gm. of 7-sulpho-3-hydroxy-naphthoic-acid-(2) in 70 cc. of water for 2 hours at 65–70° C., 1 gm. of theophylline is then added and the solution neutralised to a pH-value of 6.7 by the addition of sodium bicarbonate, which requires approximately 0.4 gm. The solution is treated with active charcoal free of iron, 0.0025 gm. of k-strophantine are dissolved in the filterate and the solution filled into 10 cc. ampoules.

Example 28

10 gm. of the sodium salt of 4-sulpho-1-hydroxy-naphthoic-(2)-acid and 4 gm. of theophylline are dissolved in approximately 80 cc. of distilled water, the solution thus formed made up to 100 cc. and filled into ampoules after filtration.

Example 29

10.5 gm. of the ethylenediamine salt of 5-sulpho-3-hydroxy-naphthoic-(2)-acid and 4 gm. of theophylline are dissolved in approximately 80 cc. of distilled water, the solution thus formed being made up to 100 cc. and then filled into ampoules after filtration.

Example 30

10 gm. of the sodium salt of 5.7-disulpho-3-hydroxy-naphthoic-(2)-acid and 3 gm. of theophylline are dissolved in approximately 80 cc. of distilled water, the solution thus formed is made up to 100 cc. and then filled into ampoules after filtration.

Example 31

10 gm. of the sodium salt of 7-sulpho-3.5-dihydroxy-naphthoic-(2)-acid and 5 gm. of theophylline are dissolved in approximately 80 cc. of distilled water, the solution thus formed is made up to 100 cc. and then filled into ampoules after filtration.

Example 32

1 gm. of nitrotheophylline and 5 gm. of the sodium salt of 7-sulpho-3-hydroxy-naphthoic-(2)-acid are dissolved in approximately 80 cc. of hot distilled water and the solution is made up to 100 cc. which is then filled into ampoules.

Example 33

2 gm. of theophylline, 0.15 gm. of phenylethyl-barbituric acid, 0.55 gm. of papaverine-sulphosalicylate and 6 gm. of the sodium salt of 7-sulpho-3-hydroxy-naphthoic-(2)-acid are dissolved in approximately 80 cc. of hot distilled water and the solution made up to 100 cc. which is then filled into ampoules.

Having now particularly described the nature of our invention by way of example, what we claim is:

1. A process for the production of a stable solution of a substituted xanthine, which comprises dissolving in water a xanthine selected from the group consisting of theophylline, caffeine, theobromine, 8-chloro-theophylline, chloro-caffeine, chloro-theobromine, 1-monomethyl xanthine, 1,3-diethyl xanthine and 1,3-di-(hydroxyl)-ethyl xanthine and a soluble salt formed by the reaction of an acid selected from the group consisting of sulpho-hydroxy benzoic acids, sulpho-hydroxy-methyl benzoic acids, sulpho resorcylic acids, sulpho-hydroxy naphthoic acids, disulpho-hydroxy naphthoic acids, sulpho-dihydroxy naphthoic acids, and at least one base selected from the group consisting of sodium, calcium, ethylenediamine, papaverine, diethanolamine, ephedrine, lobeline, adrenaline, N-α-pyridyl-N-benzyl-N', dimethylethylenediamine, p-aminobenzoic-diethyl-aminoester, diethylaminoethanol, dimethylaminoethyl-benzhydryl-ether, hydroxy-ethylamine and N-dimethylaminoethyl-N-p-methoxybenzyl-α-amino-pyridine and adjusting the pH to between 5 and 7.5.

2. A process for the production of a stable solution of a substituted xanthine, which comprises dissolving in water a xanthine selected from the group consisting of theophylline, caffeine, theobromine, 8-chloro-theophylline, chloro-caffeine, chloro-theobromine, 1-monomethyl xanthine, 1,3-diethyl xanthine and 1,3-di-(hydroxyl)-ethyl xanthine, and a soluble salt formed by the reaction of an acid selected from the group consisting of sulpho-hydroxy benzoic acids, sulpho-hydroxy-methyl benzoic acids, sulpho resorcylic acids, sulpho-hydroxy naphthoic acids, disulpho-hydroxy naphthoic acids, sulpho-dihydroxy naphthoic acids and at least one base selected from the group consisting of sodium, calcium, ethylenediamine, papaverine, diethanolamine, ephedrine, lobeline, adrenaline, N-α-pyridyl-N-benzyl-N', N'-dimethyl-ethylene-diamine, p-aminobenzoic-diethylaminoester, diethylaminoethanol, dimethylaminoethyl-benzhydryl-ether, hydroxyethylamine and N-dimethylaminoethyl-N-p-methoxybenzyl-α-amino-pyridine, adding a hydrolyzed polysaccharide and adjusting the pH to between 5 and 7.5.

3. A process for the production of a stable solution of a substituted xanthine, which comprises dissolving in water a xanthine selected from the group consisting of theophylline, caffeine, theobromine, 8-chloro-theophylline, chloro-caffeine, chloro-theobromine, 1-monomethyl xanthine, 1,3-diethyl xanthine and 1,3-di-(hydroxyl)-ethyl xanthine and a soluble salt of an acid selected from the group consisting of sulpho-hydroxy benzoic acids, sulpho-hydroxy-methyl benzoic acids, sulpho resorcylic acids, sulpho-hydroxy naphthoic acids, disulpho-hydroxy naphthoic acids, sulpho-dihydroxy naphthoic acids, and adjusting the pH to between 5 and 7.5.

4. A process for the production of a stable solution of theophylline which comprises dissolving said theophylline and sodium sulphosalicylate in water.

5. A process for the production of a stable solution of theophylline which comprises dissolving said theophylline in water with sulphosalicylate of ethylenediamine.

6. A process for the production of a stable solution of theophylline which comprises dissolving said theophylline in water with calcium sulphosalicylate.

7. A process for the production of a stable solution of theophylline which comprises dissolving said theophylline in water with ephedrine sulphosalicylate.

8. A process for the production of a stable solution of theophylline which comprises dissolving said theophylline in water with papaverine sulphosalicylate.

9. A process for the production of a stable solution of theophylline which comprises dissolving theophylline, a hydrolyzed polysaccharide and sodium sulphosalicylate in water.

10. A process for the production of a stable solution of theophylline which comprises dissolving theophylline, a hydrolyzed polysaccharide and sulphosalicylate of ethylenediamine in water.

11. A process for the production of a stable solution of theophylline which comprises dissolving theophylline, a hydrolyzed polysaccharide and calcium sulphosalicylate in water.

12. A process for the production of a stable solution of theophylline which comprises dissolving theophylline, a hydrolyzed polysaccharide and ephedrine salicylate in water.

13. The process according to claim 1 in which the solution is heated to a temperature between 60° and 100° C.

14. The process according to claim 2 in which the solution is heated to a temperature between 60° and 100° C.

15. The process according to claim 3 in which the solution is heated to a temperature between 60° and 100° C.

References Cited in the file of this patent

FOREIGN PATENTS

| | | | |
|---|---|---|---|
| 165,548 | Austria | Mar. 10, | 1950 |
| 638,030 | Germany | Nov. 7, | 1936 |
| 157,575 | Austria | Dec. 11, | 1939 |

OTHER REFERENCES

Frankel Die Arzneimittel, Synthese Berlin J. Springer 1927, page 819. (Copy in Div. 43.)